United States Patent
Bennis

(10) Patent No.: US 10,070,716 B2
(45) Date of Patent: Sep. 11, 2018

(54) HITCH RECEIVER BRUSH

(71) Applicant: Thomas J. Bennis, Callicoon, NY (US)

(72) Inventor: Thomas J. Bennis, Callicoon, NY (US)

( * ) Notice: Subject to any disclaimer, the term of this patent is extended or adjusted under 35 U.S.C. 154(b) by 0 days.

(21) Appl. No.: 15/347,053

(22) Filed: Nov. 9, 2016

(65) Prior Publication Data

US 2017/0127816 A1    May 11, 2017

Related U.S. Application Data

(60) Provisional application No. 62/252,642, filed on Nov. 9, 2015.

(51) Int. Cl.
| | | |
|---|---|---|
| *A46B 7/04* | (2006.01) | |
| *A46B 9/02* | (2006.01) | |
| *B60S 3/04* | (2006.01) | |
| *B08B 1/00* | (2006.01) | |
| *A46D 1/00* | (2006.01) | |
| *A46B 5/00* | (2006.01) | |
| *B08B 9/00* | (2006.01) | |

(52) U.S. Cl.
CPC ............ *A46B 9/026* (2013.01); *A46B 5/0095* (2013.01); *A46B 7/04* (2013.01); *A46B 7/042* (2013.01); *A46B 9/028* (2013.01); *A46D 1/0207* (2013.01); *B08B 1/002* (2013.01); *B08B 9/00* (2013.01); *B60S 3/045* (2013.01); *A46B 2200/3013* (2013.01); *A46B 2200/3046* (2013.01)

(58) Field of Classification Search
CPC ......... A46B 5/0095; A46B 7/04; A46B 7/042; A46B 7/044; A46B 7/046; A46B 7/048; A46B 9/00; A46B 9/02; A46B 9/026; A46B 9/028; A46B 2200/3006; A46B 2200/3013; A46B 2200/3046; A46B 2200/3093; B60S 3/045; B08B 1/002; B08B 9/00; B08B 9/02; B08B 9/021; B08B 9/027
USPC ........... 15/104.066, 104, 67, 104.05, 104.16, 15/104.2, 160, 164, 176.1–176.3, 176.6, 15/200, 206; D4/130–134
See application file for complete search history.

(56) References Cited

U.S. PATENT DOCUMENTS

| | | |
|---|---|---|
| 3,582,140 A | 6/1971 | Wolfgang et al. |
| 5,479,673 A | 1/1996 | Carton |
| 5,926,895 A * | 7/1999 | Roy ..................... A46B 5/0062 15/104.2 |
| D572,906 S | 7/2008 | Sales |
| 8,341,794 B1 | 1/2013 | Sales |
| 8,458,845 B1 * | 6/2013 | Tabieros .............. A46B 5/0095 15/104.05 |

* cited by examiner

*Primary Examiner* — Mark Spisich
(74) *Attorney, Agent, or Firm* — Global Intellectual Property Agency, LLC; Jordan Sworen

(57) ABSTRACT

A brush for a trailer hitch receiver. The brush includes a head shaped to conform to an interior channel of a trailer hitch receiver. This allows the brush to be used to clean the interior of a trailer hitch receiver, which is generally challenging to clean. In various embodiments, the head of the brush can be integral with the shaft. In other embodiments, the brush can include multiple interchangeable heads so that the cleaning tool can be used for multiple different types or sizes of trailer hitch receivers.

5 Claims, 4 Drawing Sheets

HITCH RECEIVER BRUSH

CROSS REFERENCE TO RELATED APPLICATIONS

This application claims the benefit of U.S. Provisional Application No. 62/252,642 filed on Nov. 9, 2015. The above identified patent application is herein incorporated by reference in its entirety to provide continuity of disclosure.

BACKGROUND OF THE INVENTION

The present invention relates to cleaning tools. More specifically, the present invention relates to cleaning tools intended for cleaning trailer hitch receivers.

Trucks, vans, cars, and other vehicles often have a trailer hitch assembly that it utilized to removably attach a trailer to the vehicle for hauling boats or trailers. The interior of a trailer hitch receiver has a tendency to accumulate dirt, debris, and rust throughout normal operation. It is undesirable for dirt, debris, and rust to occupy the trailer hitch receiver because they make it difficult to remove trailer hitches engaged with the receiver. Struggling to disengage a trailer hitch from a receiver encrusted in debris or rust can be frustrating and occasionally even dangerous. On some occasions, individuals are forced to resort to forcibly striking the receiver in order to disengage it from a trailer hitch, which can result in damage to both the trailer hitch and the receiver. Therefore, there exists a need for a tool adapted for cleaning trailer hitch receivers so that accumulated dirt, debris, and rust can be removed before they cause difficulty.

SUMMARY OF THE INVENTION

In view of the foregoing disadvantages inherent in the known types of cleaning tools now present in the prior art, the present invention provides a brush for a trailer hitch receiver. A brush for a trailer hitch receiver. The brush includes a head shaped to conform to an interior channel of a trailer hitch receiver. This allows the brush to be used to clean the interior of a trailer hitch receiver, which is generally challenging to clean. In various embodiments, the head of the brush can be integral with the shaft. In other embodiments, the brush can include multiple interchangeable heads so that the cleaning tool can be used for multiple different types or sizes of trailer hitch receivers

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
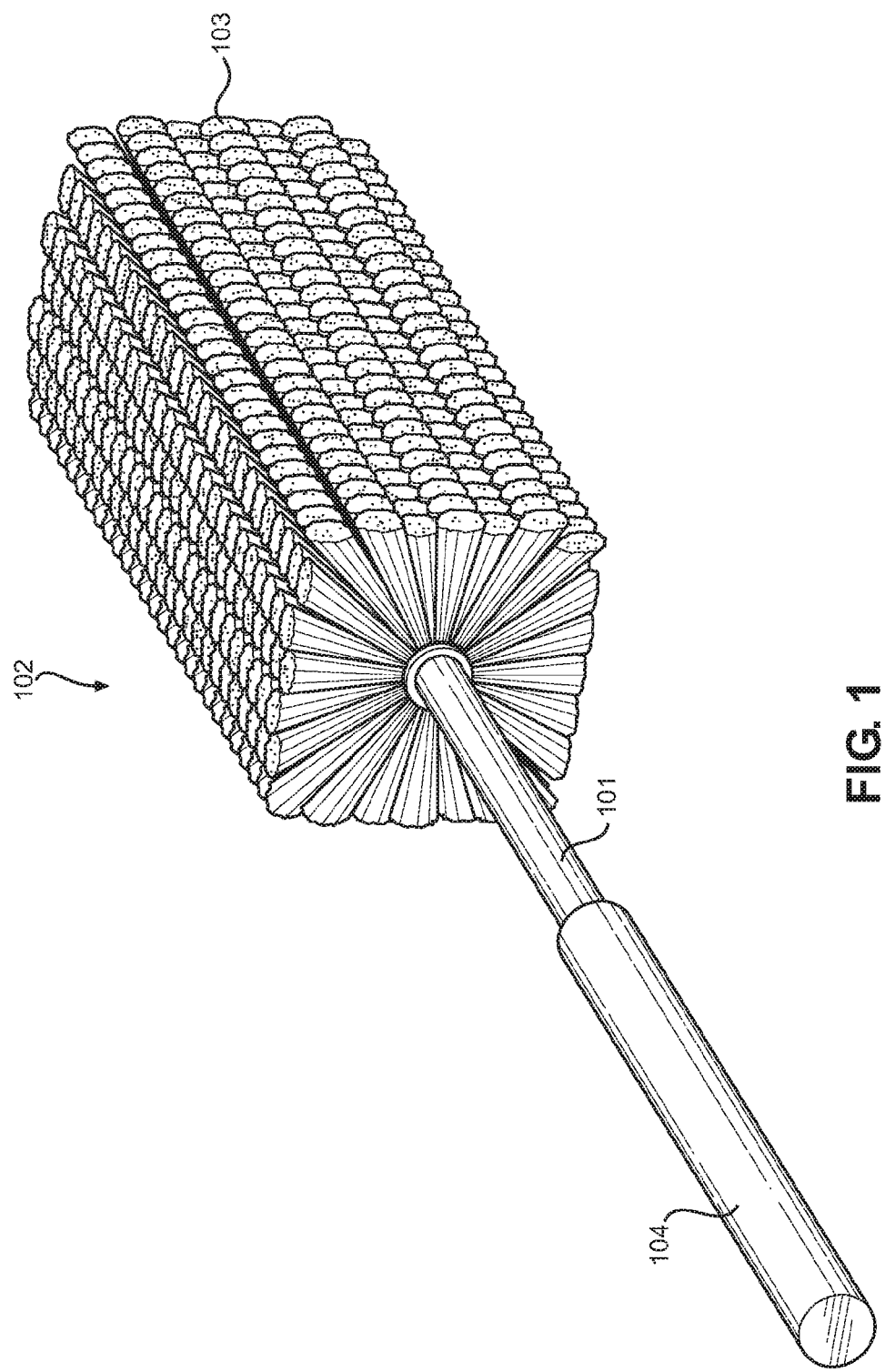
FIG. 1 shows a perspective view of a brush.

Reference is made herein to the attached drawings. Like reference numerals are used throughout the drawings to depict like or similar elements of the brush. The figures are intended for representative purposes only and should not be considered to be limiting in any respect.

Figure 3:
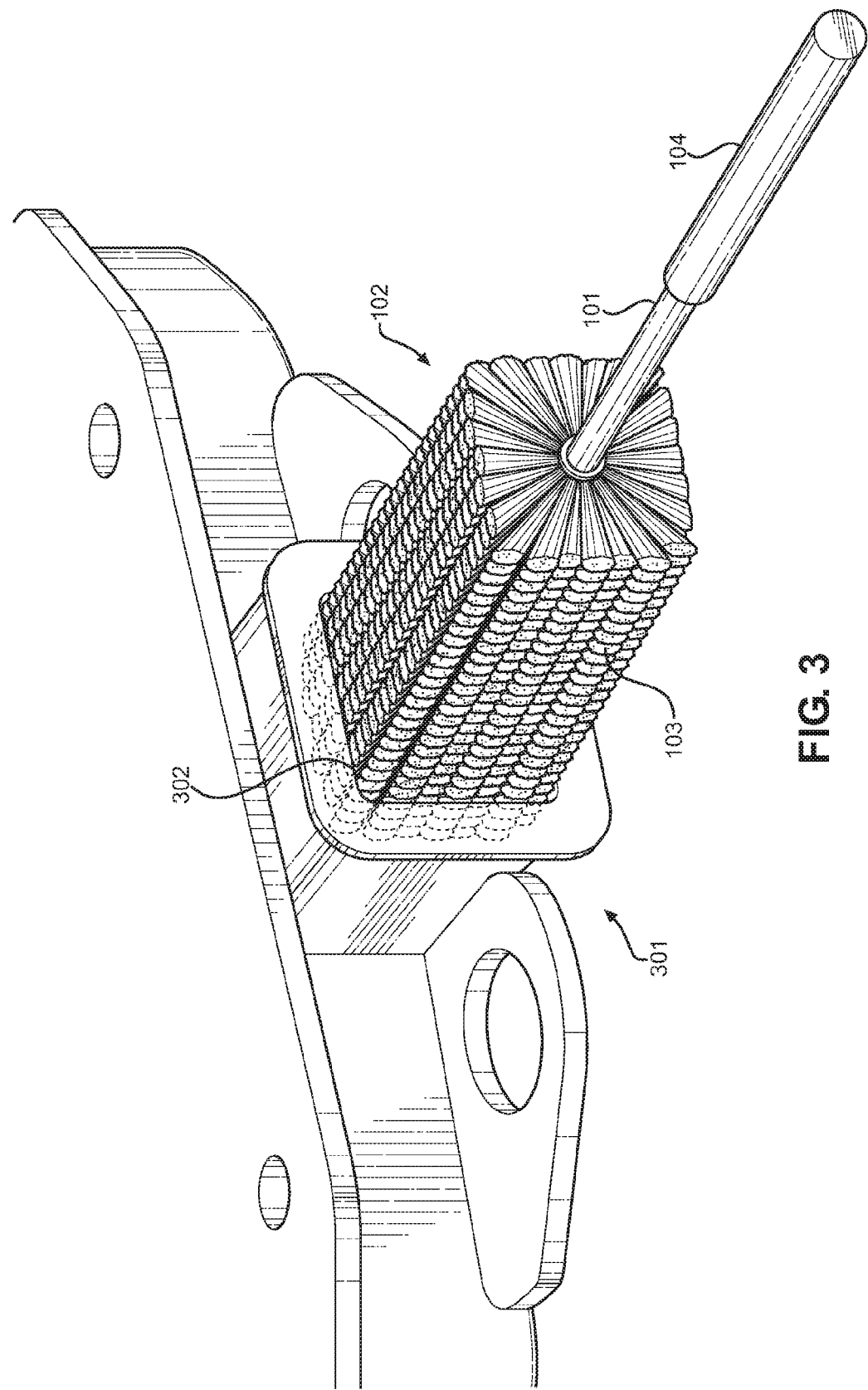
FIG. 3 shows a perspective view of a brush inserted within a hitch receiver.

Referring now to FIGS. 1 and 3, there is shown a perspective view of a brush and a perspective view of a brush inserted within a hitch receiver. The brush includes a head 102 disposed at a distal end of a shaft 101. The head 102 includes a plurality of bristles 103 extending therefrom. The shaft 101 of the brush can further include a padded portion 104 disposed at an end of the shaft 101 opposing the head 102 for ease in gripping the brush. In one embodiment of the brush, as depicted in FIG. 1, the head 102 and the shaft 101 are integrally affixed together. In other embodiments, the brush includes multiple interchangeable heads.

The head 102 of the brush is configured to conform to an interior channel of a trailer hitch receiver for cleaning thereof. The bristles 103 form the shape of a rectangular cuboid, which conforms to the shape of an interior 302 of a trailer hitch receiver 301. The width of the head 102, as formed by the bristles 103, is equal to the width of the trailer hitch receiver interior 302 to a close tolerance thereof. The bristles 103 are constructed from a material that has sufficient rigidity to serve as a scraping or cleaning surface. In one embodiment, e.g., the bristles 103 are constructed from steel.

Figure 2:
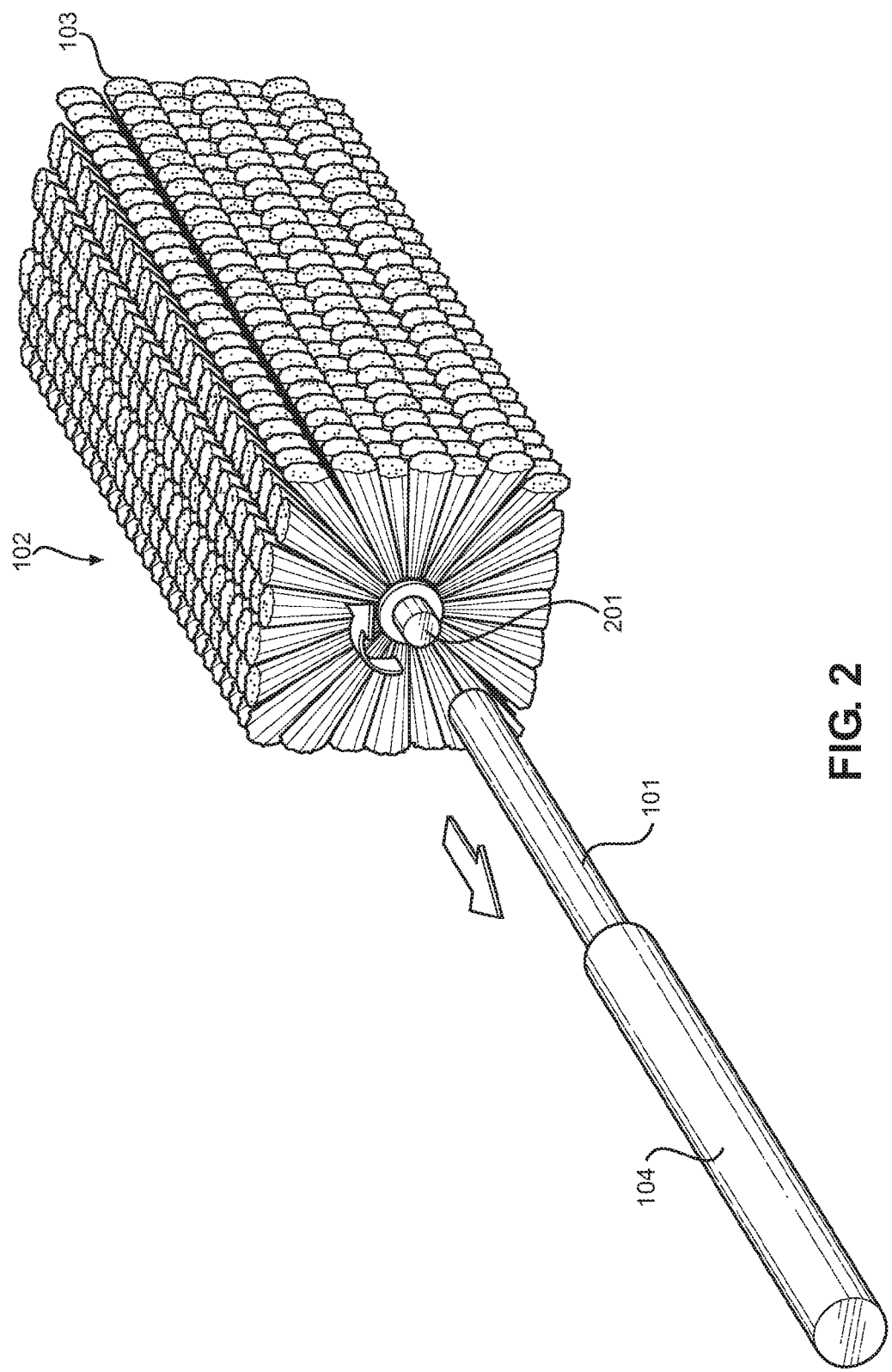
FIG. 2 shows a perspective view of a brush including a removable head.

Referring now to FIG. 2, there is shown a perspective view of a brush including a removable head. In this embodiment of the brush, the head 102 is connectable to the shaft 101 via a removable connector 201. The connector 201 can include a projection that is received within a corresponding recess and held in place via press or friction fit, as depicted. In alternative embodiments, the connector 201 can include a magnetic connector, a decent pin connector, or any other such connectors that provide a removable connection.

Figure 4C:
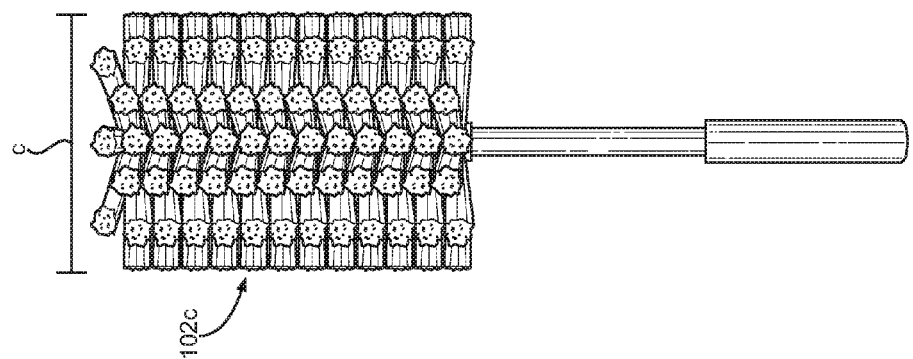
FIG. 4C shows a perspective view of a brush having a head with a third width.
Figure 4B:
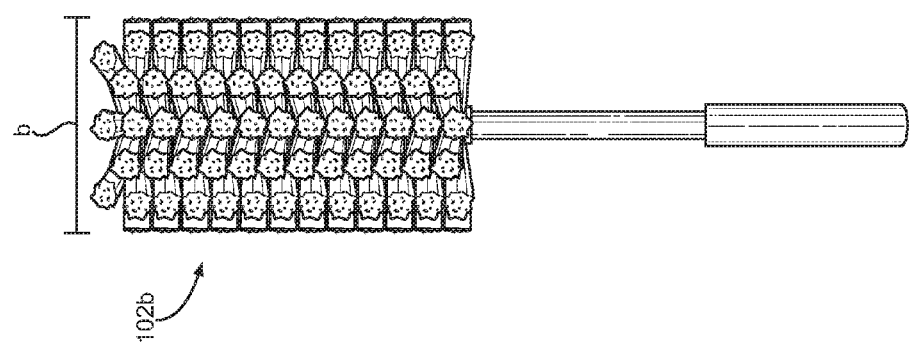
FIG. 4B shows a perspective view of a brush having a head with a second width.
Figure 4A:
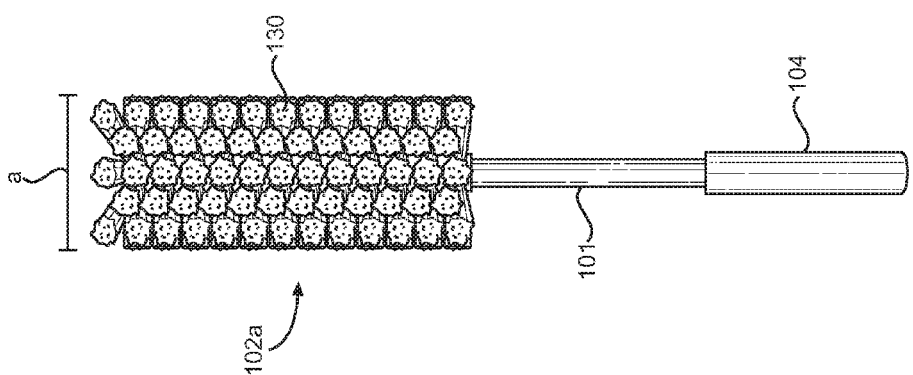
FIG. 4A shows a perspective view of a brush having a head with a first width.

Referring now to FIGS. 4A-C, there are shown perspective views of a brush having heads of varying width. In one embodiment, wherein the head is removably attachable to the shaft 101, the brush can be provided with a plurality of interchangeable heads 102a, 102b, 102c that are removably affixable to the shaft 101. The interchangeable heads 102a, 102b, 102c of different widths are needed because trailer hitch receivers differ in size. The size of the trailer hitch receiver generally depends upon the type of vehicle with which it is utilized. Conventional automobiles generally utilize a 1.25"×1.25" receiver. Trucks and SUVs generally utilize a 2"×2" receiver. A 2.5"×2.5" receiver can be utilized for commercial applications. Therefore, in an illustrative embodiment, the brush is provided as an assembly including a first head 102a having a width of a, a second head 102b having a width of b, and a third head 102c having a width of c, wherein the a<b<c. This allows the brush assembly to be customized for application in three differently sized trailer hitch receivers. In one embodiment, a is equal to 1.25", b is equal to 2", and c is equal to 2.5". Note that as the height and width of conventional trailer hitch receivers are equal, "width" as used herein is used to interchangeably refer to both the width and height dimensions of the heads 102a, 102b, 102c.

In one embodiment, interchangeable heads 102a, 102b, 102c are all uniform in length. In this embodiment, the length of the interchangeable heads 102a, 102b, 102c is, e.g., 4". A length of 4" conforms to a common length of a trailer hitch receiver, allowing the present brush to clean the entire length of the interior of the trailer hitch.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A brush assembly, comprising:
an elongate shaft;
a padded portion disposed on a first end of the shaft;
a plurality of heads removably attached to a second end of the shaft, each of the plurality of heads including a plurality of bristles forming a rectangular cuboid; and
wherein a length of the rectangular cuboid of the plurality of heads is uniform and a width of the rectangular cuboid of each of the plurality of heads varies and each width is equal to a close tolerance to a width of a hitch receiver opening.

2. The brush assembly of claim 1, wherein the plurality of bristles is constructed from steel.

3. The brush assembly of claim 1, wherein the plurality of heads are each removably connectable to the shaft via a press fit connector.

4. The brush assembly of claim 1, wherein the plurality of heads includes a first head having a first width, a second head having a second width, and a third head having a third width.

5. The brush assembly of claim 4, wherein the first width is 1.25 inches, the second width is 2 inches, and the third width is 2.5 inches.

* * * * *